United States Patent
Tsutsui et al.

(10) Patent No.: US 10,530,250 B2
(45) Date of Patent: Jan. 7, 2020

(54) MULTIPHASE CONVERTER

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Shinsuke Tsutsui, Mie (JP); Seiji Takahashi, Mie (JP); Takanori Itou, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/767,170

(22) PCT Filed: Aug. 31, 2016

(86) PCT No.: PCT/JP2016/075423
§ 371 (c)(1),
(2) Date: Apr. 10, 2018

(87) PCT Pub. No.: WO2017/064934
PCT Pub. Date: Apr. 20, 2017

(65) Prior Publication Data
US 2018/0309363 A1 Oct. 25, 2018

(30) Foreign Application Priority Data
Oct. 16, 2015 (JP) .................................. 2015-204172

(51) Int. Cl.
*H02M 3/155* (2006.01)
*H02M 1/084* (2006.01)
(Continued)

(52) U.S. Cl.
CPC ............ *H02M 3/155* (2013.01); *H02M 1/084* (2013.01); *H02M 3/33569* (2013.01); *H02M 2003/1586* (2013.01)

(58) Field of Classification Search
CPC .. H02M 3/155–3/158; H02M 3/33507; H02M 3/33523; H02M 3/33569;
(Continued)

(56) References Cited

U.S. PATENT DOCUMENTS 9,621,045 B2 * 4/2017 Tang ...................... G01R 31/42
2007/0226557 A1 * 9/2007 Fuseya .................. G11C 5/147
714/724

(Continued)

FOREIGN PATENT DOCUMENTS

JP  2008-259307 A  10/2008
JP  2010-279167 A  12/2010
(Continued)

OTHER PUBLICATIONS

Search Report for PCT/JP2016/075423, dated Nov. 15, 2016.

*Primary Examiner* — Yemane Mehari
(74) *Attorney, Agent, or Firm* — Honigman LLP

(57) ABSTRACT

Provided is a multiphase converter having a plurality of voltage conversion units, and is configured to protect the faulty phase and continue driving using another phase when an abnormality occurs in any phase. A DC-DC converter includes a plurality of voltage conversion units that are in parallel between an input-side conductive path and an output-side conductive path. A control unit subjects the plurality of voltage conversion units to a test operation in which a duty ratio of a PWM signal for each voltage conversion unit is changed. The control unit identifies an abnormal voltage conversion unit based on at least one of the states of the electric current, the voltage, and the temperature of the multiphase conversion unit during this test period, and
(Continued)

causes the remaining voltage conversion unit other than the identified abnormal voltage conversion unit to perform voltage conversion.

5 Claims, 5 Drawing Sheets

(51) Int. Cl.
*H02M 3/335* (2006.01)
*H02M 3/158* (2006.01)

(58) Field of Classification Search
CPC ........... H02M 3/33592; H02M 3/3372; H02M 3/3378; H02M 1/08; H02M 1/032; H02M 1/084; H02M 2003/1586; Y02B 70/1433
USPC ...... 363/24, 25, 65–69, 89, 90, 97, 123, 124
See application file for complete search history.

(56) References Cited

U.S. PATENT DOCUMENTS

| | | | |
|---|---|---|---|
| 2013/0005110 A1 | 1/2013 | Yoon et al. | |
| 2013/0051100 A1* | 2/2013 | Daigo ................ | H02M 3/1584 363/124 |

FOREIGN PATENT DOCUMENTS

| | | |
|---|---|---|
| JP | 2013-046541 A | 3/2013 |
| JP | 2014-183705 A | 9/2014 |

* cited by examiner

MULTIPHASE CONVERTER

CROSS-REFERENCE TO RELATED APPLICATIONS

This application is the U.S. national stage of PCT/JP2016/075423 filed Aug. 31, 2016, which claims priority of Japanese Patent Application No. JP 2015-204172 filed Oct. 16, 2015.

TECHNICAL FIELD

The present invention relates to a multiphase converter.

BACKGROUND

Multiphase DC-DC converters that have a configuration in which a plurality of voltage conversion units are connected in parallel to each other are known as DC-DC converters that drive switch elements to step up or down a DC voltage. Examples of this type of multiphase DC-DC converter include a technique as disclosed in JP 2013-46541A.

Meanwhile, in such a multiphase DC-DC converter, there may be a case where only one phase fails, and if one phase fails, it may be preferable to continue the operation using a phase that has not failed, instead of halting the entire operation of the DC-DC converter. A power supply device of JP 2013-46541A addresses this need, and is configured to acquire electric current values that are detected by an electric current detector at timings of falling edges of control signals that are applied to switch elements of respective phase chopper units, and to determine that one of the phase chopper units has failed if the acquired current values are different. Even if it is detected that one of the phase chopper units has failed, the operation of a phase chopper unit that has not failed is continued, and an output of a power generator is restricted so as not to exceed a withstanding electric current of the phase chopper unit that has not failed.

However, the power supply device of JP 2013-46541A merely restricts the entire output if an open-circuit fault has occurred in any of the switch elements of the phase chopper units, and does not include the idea of correctly identifying a portion where the fault has occurred, and reliably disabling the operation of this portion.

The present invention was made in view of the above-described circumstances, and it is an object thereof to provide a multiphase converter that is provided with a plurality of voltage conversion units, and has a configuration in which, if an abnormality has occurred in any phase, the multiphase converter can be kept activated with a phase other than the faulty phase while the faulty phase is reliably protected.

SUMMARY

According to the present invention, a multiphase converter includes: a plurality of voltage conversion units; and a control unit configured to output PWM signals to the voltage conversion units to control the voltage conversion units individually, wherein the control unit includes: a signal control unit configured to output PWM signals to the respective voltage conversion units, and change, during a predetermined test period, a duty ratio of the PWM signal that is output to a target voltage conversion unit or a target group of voltage conversion units that is to be subjected to a test operation; an abnormality identifying unit configured to identify, from among the plurality of voltage conversion units, an abnormal voltage conversion unit or a group including the abnormal voltage conversion unit subject to a predetermined abnormal state with respect to at least one of an electric current, a voltage, and a temperature during the test period; and an operation control unit configured to cause, if the abnormality identifying unit has identified an abnormal voltage conversion unit or group, any remaining voltage conversion unit of the plurality of voltage conversion units other than the identified abnormal voltage conversion unit or group including the abnormal voltage conversion unit to perform voltage conversion.

In the multiphase converter of the present invention, when a test operation is performed during a test period to change the duty ratio of a PWM signal that is output to a target voltage conversion unit or a target group of voltage conversion units, an electric current, a voltage, or a temperature will change appropriately if the test target is normal, whereas an electric current, a voltage, or a temperature will not change appropriately if the test target is abnormal. Accordingly, with a configuration such that an abnormal voltage conversion unit or a group including the abnormal voltage conversion unit subject to a predetermined abnormal state with respect to at least one of an electric current, a voltage, and a temperature during the test period is identified from among the plurality of voltage conversion units, it is easy to identify an abnormal phase or a group including the abnormal phase more accurately.

Also, the operation control unit causes, if the abnormality identifying unit has identified an abnormal voltage conversion unit or group, any remaining voltage conversion unit of the plurality of voltage conversion units other than the identified abnormal voltage conversion unit or group including the abnormal voltage conversion unit to perform voltage conversion. Accordingly, it is possible to reliably continue disabling the operation of the range of abnormality (one or more phases) to protect it, and to continue, at the same time, the voltage conversion using the remaining voltage conversion unit.

In the present invention, the terms "predetermined abnormal state" refer to a state in which the state of the electric current, the voltage, or the temperature of a voltage conversion unit is deviated from a predetermined normal state. For example, "predetermined abnormal state" may refer to a circuit state in which any of the electric current, the voltage, and the temperature of the voltage conversion unit is deviated from a given regular range. Alternatively, "predetermined abnormal state" may refer to a circuit state in which any of the electric current, the voltage, and the temperature of the voltage conversion unit is in a predetermined state of abruptly increasing or decreasing.

In the present invention, the terms "predetermined test period" refer to a period that is predetermined as a period in which a test is to be conducted in the DC-DC converter. Specifically, "predetermined test period" may be a period from when a predetermined test start condition is met to a predetermined end timing. "Test start condition" may be of various conditions, and examples of "test start condition" may include one in which "a predetermined time period has elapsed since an ignition signal was switched from OFF to ON", or one in which "a predetermined time period has elapsed from activation of the DC-DC converter". Alternatively, "test start condition" may be one in which "a predetermined time period has elapsed from the previous test period". These are merely examples, and various conditions other than these may also serve as the test start condition. Moreover, the end timing of the "predetermined test period"

may be of various timings, and examples thereof may include a "timing at which a predetermined time period has elapsed from the start of changing a duty ratio (test operation)", and a timing at which a predetermined end condition is met.

DETAILED DESCRIPTION OF PREFERRED EMBODIMENTS

Preferred embodiments of the invention will be described below.

In the present invention, when performing the test operation, the signal control unit may be configured to continue outputting a PWM signal with a duty ratio that is different from the duty ratio changed in the test operation to a voltage conversion unit not under test, so that the voltage conversion unit not under test continues the voltage conversion.

According to this configuration, it is possible to identify an abnormal voltage conversion unit, or a group including the abnormal voltage conversion unit without disabling the operations of a plurality of voltage conversion units to the extent possible.

In the present invention, the plurality of voltage conversion units may be provided with a plurality of detection units that are each associated with a voltage conversion unit or a group of voltage conversion units, and are configured to detect at least one of an electric current, a voltage, and a temperature of the associated voltage conversion unit or group of voltage conversion units. The abnormality identifying unit may be configured to identify whether or not the target voltage conversion unit or the target group of voltage conversion units that was subjected to the test operation is abnormal, based on a result of detection by the associated detection unit.

According to this configuration, it is possible for the converter to recognize more accurately how much at least one of the electric current, the voltage, and the temperature of a target voltage conversion unit or a target group of voltage conversion units that was subjected to the test operation has been changed due to the change in the duty ratio, and to identify more accurately whether or not the target voltage conversion unit or the target group of voltage conversion units is abnormal.

The present invention may further includes a temperature sensing unit configured to sense a temperature at a predetermined position on the multiphase converter. If the temperature sensed by the temperature sensing unit is within a predetermined range, the abnormality identifying unit may be configured to identify whether or not the target voltage conversion unit or the target group of voltage conversion units that was subjected to the test operation by the signal control unit is abnormal based on a result of temperature detection by the detection unit that is associated with the target voltage conversion unit or the target group of voltage conversion units.

With this, it is possible to prevent such a situation that, when the multiphase converter is under an unintended temperature condition (when the temperature at a predetermined position is out of a predetermined range), abnormality determination based on a temperature is made by the abnormality identifying unit.

Embodiment 1

The following will describe Embodiment 1 in which the present invention is embodied.

Figure 1:
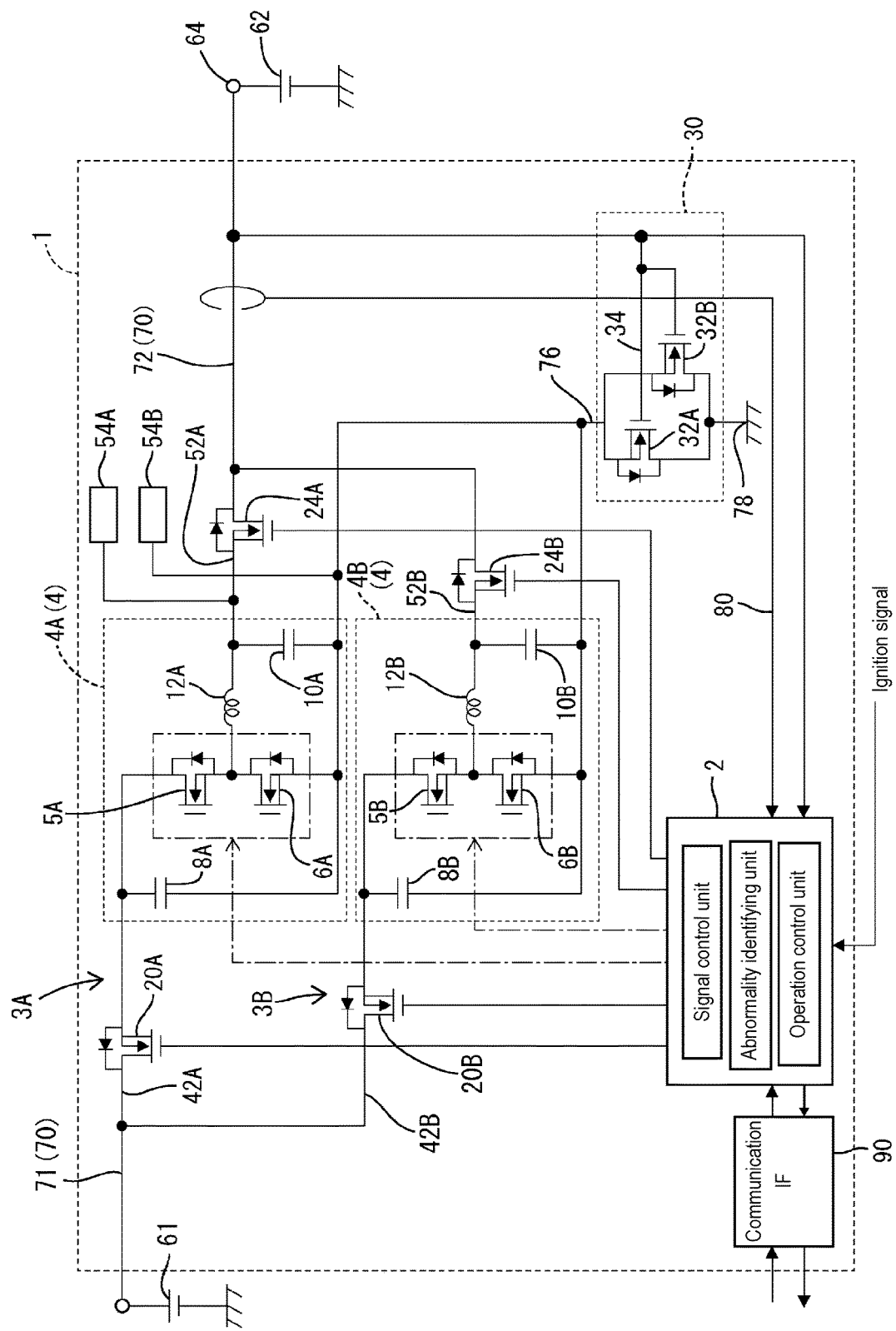
FIG. 1 is a circuit diagram schematically illustrating an example of a DC-DC converter according to Embodiment 1.

A DC-DC converter 1 shown in FIG. 1 is configured as, for example, an onboard step-down DC-DC converter, and is configured to step down a DC voltage that is applied to an input-side conductive path 71, and output the stepped-down DC voltage to an output-side conductive path 72.

The DC-DC converter 1 of FIG. 1 is provided with: a power supply conductive path 70 that includes the input-side conductive path 71 and the output-side conductive path 72, and serves as a power supply line; and a reference conductive path 78 whose electrical potential is kept at a fixed reference potential (ground potential) that is lower than an electrical potential of the power supply conductive path 70. Between the input-side conductive path 71 and the output-side conductive path 72, a plurality of voltage conversion units 4A and 4B that are configured to step down an input voltage applied to the input-side conductive path 71, and generate an output voltage are arranged in parallel. This DC-DC converter 1 is configured as a multiphase type converter (multiphase converter) in which a control unit 2 outputs PWM signals to the voltage conversion units 4A and 4B to control the voltage conversion units 4A and 4B individually.

The input-side conductive path 71 is configured as a primary side (high voltage side) power supply line to which a relatively high voltage is applied, and is conductively connected to a terminal, on a high potential-side, of a primary side power supply portion 61, so that a predetermined DC voltage (48V, for example) is applied to the input-side conductive path 71 from the primary side power supply portion 61. The input-side conductive path 71 is connected to a plurality of individual input paths 42A and 42B, which will be described later.

The primary side power supply portion 61 is constituted by, for example, an electrical storage means such as a lithium-ion battery, or an electrical double layer capacitor, and is configured to generate a first predetermined voltage. The high potential-side terminal of the primary side power supply portion 61 is kept at 48V for example, and a low-potential side terminal thereof is kept at a ground potential (0V).

The output-side conductive path 72 is configured as a secondary side (low voltage side) power supply line to which a relatively low voltage is applied. The output-side conductive path 72 is conductively connected to, for example, a terminal, on a high potential-side, of a secondary side power supply portion 62, so that a DC voltage (for example, 12V) that is lower than the output voltage of the primary side power supply portion 61 is applied to the output-side conductive path 72 from the secondary side power supply portion 62.

The secondary side power supply portion 62 is constituted by, for example, an electrical storage means such as a lead storage battery, and is configured to generate a second predetermined voltage that is lower than the first predetermined voltage that is generated by the primary side power supply portion 61. For example, the high potential-side terminal of the secondary side power supply portion 62 is kept at 12V, and a low-potential side terminal thereof is kept at a ground potential (0V). Note that "normal connection state" of the secondary side power supply portion 62 refers to a state in which, in the example of FIG. 1, a terminal 64 provided on the output-side conductive path 72 is connected to the terminal, on the positive side, of the secondary side power supply portion 62.

The reference conductive path 78 is configured as a ground, and is kept at a fixed ground potential (0V). The low-potential side terminal of the primary side power supply portion 61, and the low-potential side terminal of the secondary side power supply portion 62 are conductively connected to the reference conductive path 78, and drains of switch elements 32A and 32B, which will be described later, are connected to the reference conductive path 78.

A multiphase conversion unit 4 is provided between the input-side conductive path 71 and the output-side conductive path 72. The multiphase conversion unit 4 includes the plurality of voltage conversion units 4A and 4B that are arranged parallel to each other between the input-side conductive path 71 and the output-side conductive path 72. These voltage conversion units 4A and 4B function as synchronous rectification type step-down converters.

A first voltage conversion path 3A that is branched from the input-side conductive path 71 includes the individual input path 42A (individual conductive path) that is connected to the input-side conductive path 71, the voltage conversion unit 4A configured to convert a voltage input to the individual input path 42A using on/off operations of driving switch elements 5A and 6A, and an individual output path 52A (individual conductive path) that serves as an output path for the voltage converted by the voltage conversion unit 4A. Also, the individual input path 42A is provided with a protective switch element 20A for switching the individual input path 42A between a conductive state and a non-conductive state. Furthermore, the individual output path 52A is provided with a protective switch element 24A for switching the individual output path 52A between a conductive state and a non-conductive state in case of a back flow.

In the voltage conversion unit 4A, the individual input path 42A that is branched from the input-side conductive path 71 is connected to a drain of a switch element 5A on the high side. The drain of the switch element 5A is conductively connected to an electrode, on one side, of an input-side capacitor 8A, and is also conductively connected to the high potential-side terminal of the primary side power supply portion 61 when the switch element 20A located on the individual input path 42A is in an ON state. Furthermore, a drain of a switch element 6A on the low side and one end of a coil 12A are connected to a source of the switch element 5A. Electrodes of the input-side capacitor 8A and an output-side capacitor 10A are connected to a source of the switch element 6A on the low side. Furthermore, the other end of the coil 12A is connected to the other electrode of the output-side capacitor 10A and a source of the switch element 24A. Furthermore, a driving signal and a non-driving signal are input from a control unit 2 to a gate of the switch element 5A, so that the switch element 5A switches between an ON state and an OFF state in accordance with the signal from the control unit 2. A driving signal and a non-driving signal are also input from the control unit 2 to a gate of the switch element 6A on the low side, so that the switch element 6A switches between an ON state and an OFF state in accordance with the signal from the control unit 2.

A second voltage conversion path 3B that is branched from the input-side conductive path 71 has the same configuration as that of the first voltage conversion path 3A. This second voltage conversion path 3B includes the individual input path 42B (individual conductive path) that is connected to the input-side conductive path 71, the voltage conversion unit 4B configured to convert a voltage input to the individual input path 42B using on/off operations of driving switch elements 5B and 6B, and an individual output path 52B (individual conductive path) that serves as an output path for the voltage converted by the voltage conversion unit 4B. The individual input path 42B is also provided with a protective switch element 20B for switching the individual input path 42B between a conductive state and a non-conductive state. Furthermore, the individual output path 52B is provided with a protective switch element 24B for switching the individual output path 52B between a conductive state and a non-conductive state in case of a back flow.

In the voltage conversion unit 4B, the individual input path 42B that is branched from the input-side conductive path 71 is connected to a drain of a switch element 5B on the high side. The drain of the switch element 5B is conductively connected to an electrode, on one side, of an input-side capacitor 8B, and is also conductively connected to the high potential-side terminal of the primary side power supply portion 61 when the switch element 20B located on the individual input path 42B is an ON state. Furthermore, a drain of a switch element 6B on the low side and one end of a coil 12B are connected to a source of the switch element 5B. Electrodes of the input-side capacitor 8B and an output-side capacitor 10B are connected to a source of the switch element 6B on the low side. Furthermore, the other end of the coil 12B is connected to the other electrode of the output-side capacitor 10B and a source of the switch element 24B. Furthermore, a driving signal and a non-driving signal are input from the control unit 2 to a gate of the switch element 5B, so that the switch element 5B switches between an ON state and an OFF state in accordance with the signal from the control unit 2. A driving signal and a non-driving signal are also input from the control unit 2 to a gate of the switch element 6B on the low side, so that the switch element 6B switches between an ON state and an OFF state in accordance with the signal from the control unit 2.

The sources of the switch elements 6A and 6B, the electrodes on one sides of the input-side capacitors 8A and 8B, and the electrodes on one sides of the output-side capacitors 10A and 10B are respectively conductively connected to each other, and are connected to sources of the switch elements 32A and 32B via a conductive path 76. Drains of the switch elements 24A and 24B are conductively connected to each other, and are connected to the output-side conductive path 72.

The voltage conversion units 4A and 4B having this configuration function as synchronous rectification type step-down converters. The voltage conversion unit 4A switches the switch element 5A on the high side between the ON operation and the OFF operation in synchronization with switching the switch element 6A on the low side between the OFF operation and ON operation, so as to step down a DC voltage applied to the individual input path 42A, and output the stepped-down DC voltage to the individual output path 52A. Specifically, the control unit 2 gives PWM signals to the gates of the switch elements 5A and 6A, so that a first state, in which the switch element 5A is in the ON state and the switch element 6A is in the OFF state, and a second state, in which the switch element 5A is in the OFF state and the switch element 6A is in the ON state, are alternately switched. As a result of such switching between the first state and the second state being repeated, a DC voltage applied to the individual input path 42A is stepped down, and the stepped-down DC voltage is output to the individual output path 52A. The output voltage of the individual output path 52A depends on the duty ratio of the PWM signals applied to the gates of the switch elements 5A and 6A.

The voltage conversion unit 4B has the same configuration, and switches the switch element 5B on the high side between the ON operation and the OFF operation in synchronization with switching the switch element 6B on the low side between the OFF operation and the ON operation, so as to step down a DC voltage applied to the individual input path 42B, and output the stepped-down DC voltage to the individual output path 52B. Specifically, the control unit 2 gives PWM signals to the gates of the switch elements 5B and 6B, so that a first state, in which the switch element 5B is in the ON state and the switch element 6B is in the OFF state, and a second state, in which the switch element 5B is in the OFF state and the switch element 6B is in the ON state, are alternately switched. As a result of such switching between the first state and the second state being repeated, a DC voltage applied to the individual input path 42B is stepped down, and the stepped-down DC voltage is output to the individual output path 52B. The output voltage of the individual output path 52B depends on the duty ratio of the PWM signals applied to the gates of the switch elements 5B and 6B. Note that the timings at which the driving signals are given to both of the voltage conversion units 4A and 4B are not particularly limited, and it is sufficient that, for example, the operation of the voltage conversion unit 4A and the operation of the voltage conversion unit 4B are performed with their phases shifted by a well-known control method.

Furthermore, the DC-DC converter 1 of FIG. 1 is provided with a reverse connection protection circuit portion 30, which is configured such that, if the secondary side power supply portion 62 is reversely connected, then the conduction of the conductive path 76 is interrupted, preventing an electrical current from flowing into the secondary side in the case of the reverse connection. This reverse connection protection circuit portion 30 includes: the switch elements 32A and 32B for protecting from reverse connection that are arranged parallel to the conductive path 76 running between the voltage conversion units 4A and 4B and the reference conductive path 78; and a conductive path 34 that keeps the gate potentials of the switch elements 32A and 32B at the same electrical potential as that of the output-side conductive path 72. The switch elements 32A and 32B are configured to switch between an OFF state in which the conduction of the conductive path 76 is interrupted, and an ON state in which the interruption is cancelled.

In the reverse connection protection circuit portion 30, the switch elements 32A and 32B are turned on if the terminals of at least the secondary side power supply portion 62 (low voltage side power supply portion) are in a normal connection state as shown in FIG. 1. In this case, when the multiphase conversion unit 4 is not activated, the gate potentials of the switch elements 32A and 32B are substantially the same as the positive electrode potential (for example, 12V) of the secondary side power supply portion 62, and are kept in the state of being higher than the source potentials, and thus the switch elements 32A and 32B are kept in the ON state. The sources of the switch elements 6A and 6B on the low side, the input-side capacitors 8A and 8B, and the output-side capacitors 10A and 10B are all kept as being conductively connected to the reference conductive path 78. On the other hand, in a case of the reverse connection in which the terminals of the secondary side power supply portion 62 (low voltage side power supply portion) are connected in a reversed manner with its positive and negative terminals reversed, the gate potentials of the switch elements 32A and 32B are substantially the same as the negative electrode potential (for example, −12V) of the secondary side power supply portion 62, and are kept in the state of being lower than the source potentials. Accordingly, the switch elements 32A and 32B are kept in the OFF state. If the switch elements 32A and 32B are in the OFF state, then a state is realized in which the sources of the switch elements 6A and 6B, the input-side capacitors 8A and 8B, and the output-side capacitors 10A and 10B are all not conductively connected to the reference conductive path 78. Moreover, in the configuration of FIG. 1, even if the secondary side power supply portion 62 and the output-side conductive path 72 are open, the switch elements 32A, 32B will be kept in the OFF state.

The DC-DC converter 1 includes a current detection path 80 for detecting an electric current flowing through the output-side conductive path 72. The current detection path 80 is a path for detecting an electric current flowing through the output-side conductive path 72 using a well-known method, and a control unit 2 recognizes a value of the current flowing through the output-side conductive path 72 based on a value input via the current detection path 80. Note that in FIG. 1, a simplified current detection path 80 is shown, but the current detection path 80 may include any of various well-known current detecting circuits serving as a specific current detecting circuit as long as the control unit 2 can recognize a value Io of the current flowing through the output-side conductive path 72.

The control unit 2 determines whether or not an overcurrent has occurred in the output-side conductive path 72. Specifically, the control unit 2 compares the value Io of the current flowing through the output-side conductive path 72 with a predetermined threshold It, and the control unit 2 determines that there is no overcurrent if Io≤It is met, and determines that there is an overcurrent if Io>It is met. Furthermore, a voltage from the output-side conductive path 72 is also input to the control unit 2, and the control unit 2 also determines whether or not there is an overvoltage in the output-side conductive path 72. Specifically, the control unit 2 compares a value Vo of the voltage of the output-side conductive path 72 that was detected by the control unit 2 with a predetermined threshold Vt, and the control unit 2 determines that there is no overvoltage if Vo≤Vt is met, and determines that there is an overvoltage if Vo>Vt is met. Also, the control unit 2 is configured to switch both of the protective switch elements 20A and 20B to the OFF state, if an overcurrent state or an overvoltage state is given, that is, the state Io>It or Vo>Vt is given.

Furthermore, the control unit 2 is configured to be able to determine whether an electric current is flowing through the output-side conductive path 72 in a first direction from the multiphase conversion unit 4 side toward the secondary side power supply portion 62 side, or a second direction from the secondary side power supply portion 62 side toward the multiphase conversion unit 4 side. The control unit 2 may also be configured to switch both of the protective switch elements 24A and 24B to the OFF state, if it is detected that the electric current is flowing through the output-side conductive path 72 in the above-described "second direction" (that is, if it is determined that the direction of the electric current is a back flow).

The following will describe abnormality detection control.

As shown in FIG. 1, an ignition signal is input from a not-shown ignition switch to the control unit 2. The configuration is such that, if the ignition switch is in an ON state, an ignition signal (ON signal) indicating the ON state is input to the control unit 2, and if the ignition switch is in the OFF state, an ignition signal (OFF signal) indicating the OFF state is input to the control unit 2. Then, the control unit 2 executes abnormality detection control, which will be described below, each time the ignition signal is switched from the OFF signal to the ON signal, for example. Specifically, the abnormality detection control may be performed using power supplied from the primary side power supply portion 61, after the ignition signal is switched from the OFF signal to the ON signal and before a not-shown power generator connected to the input-side conductive path 71 is activated. Alternatively, the abnormality detection control may be performed after the ignition signal is switched from the OFF signal to the ON signal, and the not-shown power generator connected to the input-side conductive path 71 is activated. Note that these timings at which the abnormality detection control, which will be described below, is executed are merely examples, and the abnormality detection control, which will be described below, may be executed, for example, at a timing at which an abnormality has occurred in the multiphase conversion unit 4 (such as when an overcurrent, an overvoltage, overheating, or a back flow has occurred) or at another timing at which a low voltage control is executed.

After the ignition switch is switched from OFF to ON, the control unit 2 activates the multiphase conversion unit 4. First, the control unit 2 causes the voltage conversion units 4A and 4B to perform the above-described normal operation. Here, the duty ratio of PWM signals applied to the voltage conversion units 4A and 4B is set to a predetermined duty ratio D1 with which a voltage V1 (for example, 13V) that is higher than an output voltage V0 (for example, 12V) of the secondary side power supply portion 62 is output to the output-side conductive path 72. Specifically, the protective switch elements 20A and 24A of the voltage conversion unit 4A are switched to the ON state, and PWM signals set to the duty ratio D1 are respectively output to the driving switch elements 5A and 6A. Similarly, the protective switch elements 20B and 24B of the voltage conversion unit 4B are switched to the ON state, and PWM signals set to the duty ratio D1 are respectively output to the driving switch elements 5B and 6B. The PWM signals are output to the voltage conversion units 4A and 4B with their phases shifted by a well-known control method. In such a normal operation, well-known feed-back control is executed using, for example, the predetermined voltage V1 as a target voltage, and adjusts the duty ratio D1 for obtaining the predetermined voltage V1.

Figure 2:
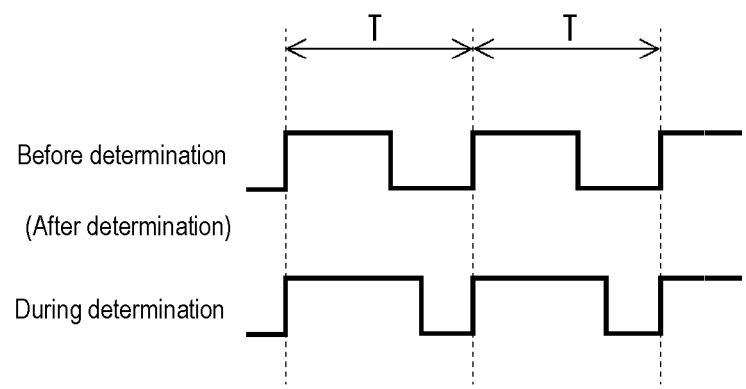
FIG. 2 is a diagram illustrating switching a duty ratio in Embodiment 1.

Then, the control unit 2 performs a test operation on the voltage conversion unit 4A. Specifically, while the protective switch elements 20A and 24A of the voltage conversion unit 4A are kept in the ON state, PWM signals set to a duty ratio D2 for abnormality detection are output to the respective driving switch elements 5A and 6A. The "duty ratio D2" is greater, as shown in "during determination" of FIG. 2, than the duty ratio D1 "before determination", and is specifically a duty ratio with which a voltage V2 (for example, 15V) that is higher than the voltage V1 (for example, 13V), which is output in the case of the duty ratio D1, is output to the output-side conductive path 72. The duty ratio D2 that is applied to the target voltage conversion unit 4A during a test period in which the voltage conversion unit 4A is subjected to the test operation is a duty ratio for outputting a target voltage value and a target current value for testing, which are different from a target voltage value and a target current value for normal operation, which are continuously set for the voltage conversion unit 4B that is not under test.

The voltage conversion unit 4A performs a voltage conversion operation (test operation) of stepping down a DC voltage applied to the individual input path 42A in accordance with the PWM signal with the changed duty ratio D2, and outputting the stepped-down DC voltage to the individual output path 52A. While the voltage conversion unit 4A performs such a test operation, a PWM signal with the duty ratio D1 is continuously output to the other voltage conversion unit 4B. Accordingly, the voltage conversion unit 4B performs a voltage conversion operation (normal operation) of stepping down a DC voltage applied to the individual input path 42B in accordance with the PWM signal with the duty ratio D1, and outputting the stepped-down DC voltage to the individual output path 52B. The control unit 2 performs this control of changing to increase only the duty ratio of the voltage conversion unit 4A for a predetermined time period, and compares, during this predetermined time period (test period), a voltage value Va on the individual output path 52A with a first threshold Vt1 and a second threshold Vt2. Note that the "first threshold Vt1" is a value that is higher than the above-described V2, and the "second threshold Vt2" is a value that is lower than the above-described V2 and higher than V1, for example. If the state Va>Vt1 or Va<Vt2 is given during the predetermined time period (test period) in which the duty ratio of the voltage conversion unit 4A is changed to D2, then it is determined that the voltage conversion unit 4A is abnormal. In other words, the voltage conversion unit 4A is identified as an "abnormal voltage conversion unit". In contrast, if the state Vt2<Va<Vt1 is kept during the predetermined time period, then it is determined that the voltage conversion unit 4A is normal. Note that in the example of FIG. 1, a voltage Va of the individual output path 52A is detected by the voltage detection unit 54A, and a voltage Vb of the individual output path 52B is detected by the voltage detection unit 54B, and the voltages Va and Vb that are detected by the respective detection units are input to the control unit 2.

Then, the control unit 2 performs a test operation on the voltage conversion unit 4B. Specifically, while the protective switch elements 20B and 24B of the voltage conversion unit 4B are kept in the ON state, PWM signals set to the above-described duty ratio D2 for abnormality detection are output to the respective driving switch elements 5B and 6B. The voltage conversion unit 4B performs a voltage conversion operation (test operation) of stepping down a DC voltage applied to the individual input path 42B in accordance with the PWM signal with the changed duty ratio D2, and outputting the stepped-down DC voltage to the individual output path 52B. While the voltage conversion unit 4B performs such a test operation, a PWM signal with the duty ratio D1 is output to the other voltage conversion unit 4A. Accordingly, the voltage conversion unit 4A performs a voltage conversion operation (normal operation) of stepping down a DC voltage applied to the individual input path 42A in accordance with the PWM signal with the duty ratio D1, and outputting the stepped-down DC voltage to the individual output path 52A. Note that the duty ratio D2 that is set for the target voltage conversion unit 4B during a test period in which the voltage conversion unit 4B is subjected to the test operation is a duty ratio for outputting a target voltage value and a target current value for testing, which are different from a target voltage value and a target current value for normal operation, which are continuously set for the voltage conversion unit 4A that is not under test. The control unit 2 performs this control of changing only the duty ratio of the voltage conversion unit 4B for a predetermined time period, and compares, during this predetermined time period (test period), a voltage value Vb of the individual output path 52B with the above-described first threshold Vt1 and second threshold Vt2. If the state Vb>Vt1 or Vb<Vt2 is given during the predetermined time period (test period) in which the duty ratio of the voltage conversion unit 4B is changed to D2, then it is determined that the voltage conversion unit 4B is abnormal. In other words, the voltage conversion unit 4B is identified as an "abnormal voltage conversion unit". In contrast, if the state Vt2<Vb<Vt1 is kept during the predetermined time period, it is determined that the voltage conversion unit 4B is normal.

In this configuration, the control unit 2 corresponds to an example of a signal control unit, is configured to output, to the driving switch elements respectively provided on the voltage conversion units 4A and 4B of the multiphase conversion unit 4, PWM signals for alternately switching an ON signal and an OFF signal to each other, and functions to change the duty ratio of a PWM signal that is output to a target voltage conversion unit that is to be subjected to a test operation during a predetermined test period. More specifically, when a test operation is performed on each of the plurality of voltage conversion units 4A and 4B constituting the multiphase conversion unit 4, a PWM signal with the duty ratio D1, which is different from the duty ratio D2 changed in the test operation, is continuously output to the voltage conversion unit that is not under test, and voltage conversion is continued.

Furthermore, the plurality of voltage detection units 54A and 54B correspond to examples of detection units, and respectively detect output voltages of the plurality of voltage conversion units 4A and 4B. The control unit 2 corresponds to an example of an abnormality identifying unit, and functions to identify, based on the voltage state of the multiphase conversion unit 4 (plurality of voltage conversion units 4A and 4B) during the test period in which the test operation is performed by the signal control unit, an "abnormal voltage conversion unit" in which a voltage is abnormal from among the plurality of voltage conversion units 4A and 4B. Specifically, the control unit 2 identifies whether or not the target voltage conversion unit that was subjected to the test operation is abnormal, based on results of detection by the plurality of voltage detection units 54A and 54B (detection units).

With such control, if it is determined that either of the voltage conversion units 4A and 4B is abnormal, then the control unit 2 halts the operation of the identified "abnormal voltage conversion unit", and sends predetermined abnormality information via a communication interface 90 to a higher-order system. Then, the control unit 2 causes any remaining voltage conversion unit (of the plurality of voltage conversion units 4A and 4B constituting the multiphase conversion unit 4) other than the "abnormal voltage conversion unit" to perform the voltage conversion. For example, if it is determined that the voltage conversion unit 4A is abnormal and the voltage conversion unit 4B is normal, the control unit 2 sends information indicating that the voltage conversion unit 4A is abnormal via the communication interface 90 to the high-order system. Then, the multiphase conversion unit 4 continues the operation such that the operation of the voltage conversion unit 4A that is identified as being abnormal is halted, and only the remaining voltage conversion unit 4B other than the voltage conversion unit 4A performs the voltage conversion. Note that, if it is determined that all of the voltage conversion units 4A and 4B are abnormal, then the multiphase conversion unit 4 itself is disabled.

In the present configuration, the control unit 2 corresponds to an example of an operation control unit, and functions to cause, if an "abnormal voltage conversion unit" is identified by the driving abnormality identifying unit, any remaining voltage conversion unit (of the plurality of voltage conversion units 4A and 4B constituting the multiphase conversion unit 4) other than the identified "abnormal voltage conversion unit" to perform the voltage conversion.

As described above, in the DC-DC converter 1 of the present configuration, when a test operation is performed during a test period to change the duty ratio of a PWM signal that is output to a target voltage conversion unit, the voltage will change appropriately if the test target is normal, whereas the voltage will not change appropriately if the test target is abnormal. Accordingly, by realizing a configuration in which an abnormal voltage conversion unit is identified based on the voltage state of the multiphase conversion unit 4 during a test period, it is easy to identify an abnormal phase more accurately.

Then, if the identification is made by the abnormality identifying unit, the control unit 2 that corresponds to the operation control unit causes any remaining voltage conversion unit (of the plurality of voltage conversion units 4A and 4B constituting the multiphase conversion unit 4) other than the identified "abnormal voltage conversion unit" to perform voltage conversion. Accordingly, it is possible to reliably continue disabling the operation of the range of abnormality (one or more phases) to protect it, and to continue, at the same time, the voltage conversion using the remaining voltage conversion unit.

In the DC-DC converter 1 of the present configuration, when each voltage conversion unit of the plurality of voltage conversion units 4A and 4B constituting the multiphase conversion unit 4 is subjected to a test operation, the control unit 2 that corresponds to the signal control unit is configured to continue outputting, to the voltage conversion unit that is not subjected to the test operation, a PWM signal with a duty ratio different from the duty ratio changed in the test operation, so that this voltage conversion unit continues the voltage conversion. According to this configuration, it is possible to identify the abnormal voltage conversion unit without disabling the plurality of voltage conversion units 4A and 4B to the extent possible.

In the DC-DC converter 1 of this configuration, the plurality of voltage conversion units 4A and 4B are provided with a plurality of voltage detection units 54A and 54B (detection units) that are respectively associated with the plurality of voltage conversion units 4A and 4B, and are configured to detect voltages for the respective voltage conversion units. The control unit 2 that corresponds to the abnormality identifying unit is configured to determine, based on the result of detection by the voltage detection unit that is associated with the target voltage conversion unit that was subjected to the test operation, whether or not the target voltage conversion unit is abnormal. According to this configuration, it is possible to recognize more accurately how much the voltage has been changed due to the change in the duty ratio in the target voltage conversion unit subjected to the test operation, and to identify more accurately whether or not the target voltage conversion unit is abnormal.

Embodiment 2

Figure 3:
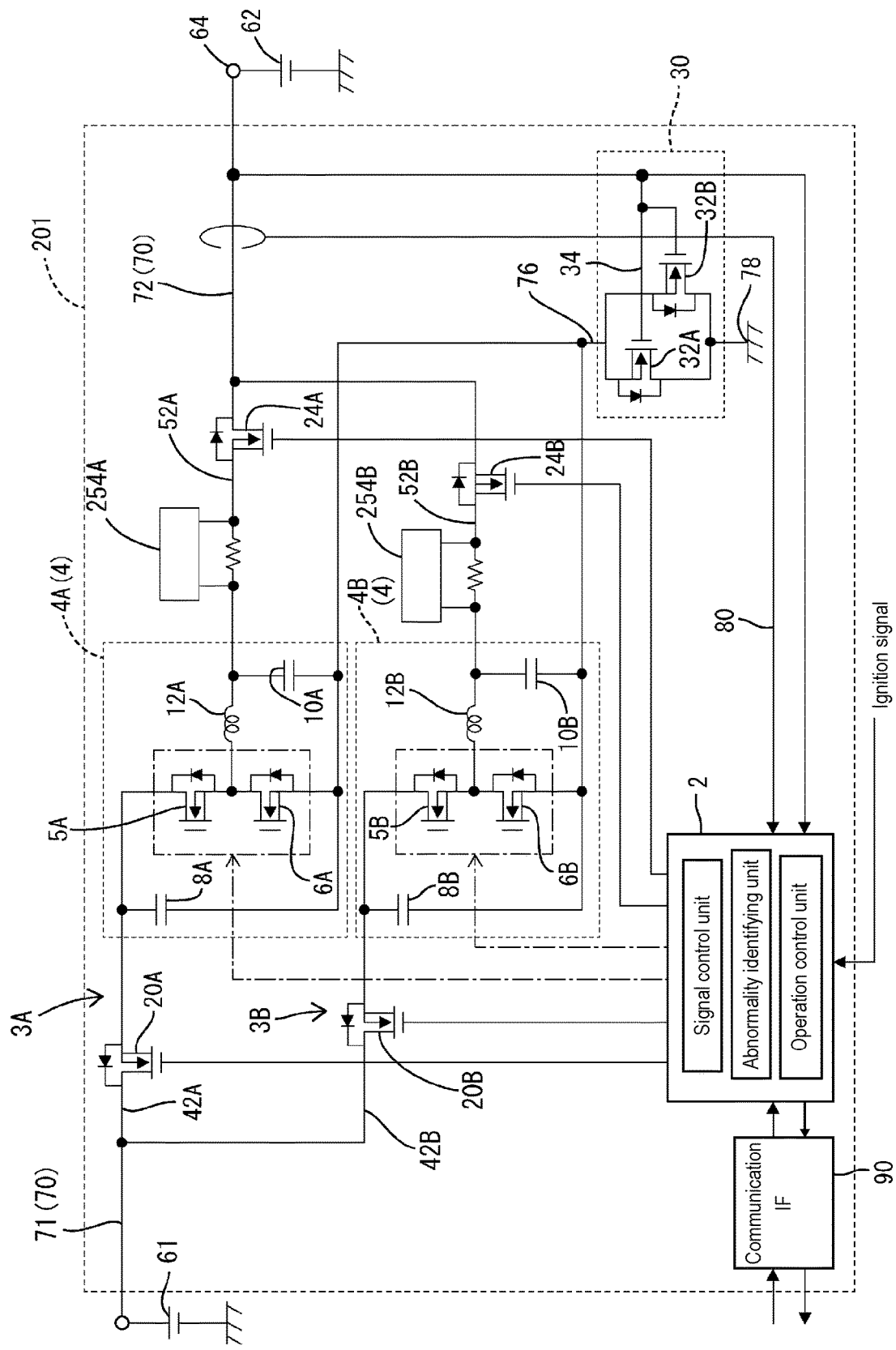
FIG. 3 is a circuit diagram schematically illustrating an example of a DC-DC converter according to Embodiment 2.

Hereinafter, Embodiment 2 will be described. As shown in FIG. 3, a DC-DC converter 201 of Embodiment 2 is the same as the converter of Embodiment 1, except for current detection units 254A and 254B being provided in place of the voltage detection units 54A and 54B, and a determination method in abnormality detection control.

The following will describe abnormality detection control in Embodiment 2.

Also in the DC-DC converter 201 shown in FIG. 3, after the ignition signal is switched from OFF to ON, the control unit 2 activates the multiphase conversion unit 4. First, the voltage conversion units 4A and 4B are subjected to a normal operation that is similar to that of the above-described Embodiment 1. Here, the duty ratio of PWM signals that are output to the voltage conversion units 4A and 4B is set to a predetermined duty ratio D1 with which a voltage V1 (for example, 13V) that is higher than an output voltage V0 (for example, 12V) of the secondary side power supply portion 62 is output to the output-side conductive path 72. Specifically, the protective switch elements 20A and 24A of the voltage conversion unit 4A are switched to the ON state, and PWM signals set to the duty ratio D1 are respectively output to the driving switch elements 5A and 6A. Setting of the duty ratio D1 is configured in the same manner as in Embodiment 1. Similarly, the protective switch elements 20B and 24B of the voltage conversion unit 4B are switched to the ON state, and PWM signals set to the duty ratio D1 are respectively output to the driving switch elements 5B and 6B. The PWM signals are output to the voltage conversion units 4A and 4B with their phases shifted by a well-known control method.

Then, the control unit 2 performs a test operation on the voltage conversion unit 4A. Specifically, while the protective switch elements 20A and 24A of the voltage conversion unit 4A are kept in the ON state, PWM signals set to a duty ratio D2 for abnormality detection are output to the respective driving switch elements 5A and 6A. "Duty ratio D2" is set in the same manner as in Embodiment 1, and is greater, as shown in "during determination" of FIG. 2, than the duty ratio D1 "before determination". The voltage conversion unit 4A performs a voltage conversion operation (test operation) of stepping down a DC voltage applied to the individual input path 42A in accordance with the PWM signal with the changed duty ratio D2, and outputting the stepped-down DC voltage to the individual output path 52A. While the voltage conversion unit 4A performs such a test operation, a PWM signal with the duty ratio D1 is continuously output to the other voltage conversion unit 4B. Accordingly, the voltage conversion unit 4B performs a voltage conversion operation (normal operation) of stepping down a DC voltage applied to the individual input path 42B in accordance with the PWM signal with the duty ratio D1, and outputting the stepped-down DC voltage to the individual output path 52B. The control unit 2 performs such control of changing only the duty ratio of the voltage conversion unit 4A for a predetermined time period, and compares, during this predetermined time period (test period), an electric current value Ia of the individual output path 52A with a first threshold It1 and a second threshold It2. If the state Ia>It1 or Ia<It2 is given during the predetermined time period (test period) in which the duty ratio of the voltage conversion unit 4A is changed to D2, then it is determined that the voltage conversion unit 4A is abnormal. In other words, the voltage conversion unit 4A is identified as an "abnormal voltage conversion unit". In contrast, if the state It2<Ia<It1 is kept during the predetermined time period, then it is determined that the voltage conversion unit 4A is normal. Note that in the example of FIG. 1, an electric current value Ia of the individual output path 52A is detected by the current detection unit 254A, and an electric current value Ib of the individual output path 52B is detected by the current detection unit 254B, and the electric current values Ia and Ib that are detected by the respective detection units are input to the control unit 2.

Then, the control unit 2 performs a test operation on the voltage conversion unit 4B. Specifically, while the protective switch elements 20B and 24B of the voltage conversion unit 4B are kept in the ON state, PWM signals set to the above-described duty ratio D2 for abnormality detection are output to the respective driving switch elements 5B and 6B. The voltage conversion unit 4B performs a voltage conversion operation (test operation) of stepping down a DC voltage applied to the individual input path 42B in accordance with the PWM signal with the changed duty ratio D2, and outputting the stepped-down DC voltage to the individual output path 52B. While the voltage conversion unit 4B performs such a test operation, a PWM signal with the duty ratio D1 is output to the other voltage conversion unit 4A. Accordingly, the voltage conversion unit 4A performs a voltage conversion operation (normal operation) of stepping down a DC voltage applied to the individual input path 42A in accordance with the PWM signal with the duty ratio D1, and outputting the stepped-down DC voltage to the individual output path 52A. The control unit 2 performs such control of changing only the duty ratio of the voltage conversion unit 4B for a predetermined time period, and compares, during this predetermined time period (test period), an electric current value Ib of the individual output path 52B with a first threshold It1 and a second threshold It2. The "first threshold It1" is an electric current value that is slightly higher than a normal current value of an electric current that should flow in the individual output path 52B in the case of the duty ratio D2, and the "second threshold It2" is an electric current value that is slightly lower than the normal current value of an electric current that should flow in the individual output path 52B in the case of the duty ratio D2. If the state Ib>It1 or Ib<It2 is given during the predetermined time period (test period) in which in which the duty ratio of the voltage conversion unit 4B is changed to D2, then it is determined that the voltage conversion unit 4B is abnormal. In other words, the voltage conversion unit 4B is identified as an "abnormal voltage conversion unit". In contrast, if the state It2<Ib<It1 is kept during the predetermined time period, then it is determined that the voltage conversion unit 4B is normal.

The plurality of current detection units 254A and 254B correspond to examples of detection units, and respectively detect output electric currents of the plurality of voltage conversion units 4A and 4B. Also, the control unit 2 that corresponds to the abnormality identifying unit identifies whether or not the target voltage conversion unit that was subjected to the test operation is abnormal, based on results of detection by the plurality of current detection units 254A and 254B (detection units). If an "abnormal voltage conversion unit" is identified by the abnormality identifying unit, the control unit 2 that corresponds to the operation control unit causes "any remaining voltage conversion unit" (of the plurality of voltage conversion units 4A and 4B constituting the multiphase conversion unit 4) other than the identified "abnormal voltage conversion unit" to perform voltage conversion. Accordingly, it is possible to reliably continue disabling the operation of the range of abnormality to protect it, and to continue, at the same time, the operation using the remaining voltage conversion unit.

Embodiment 3

Hereinafter, Embodiment 3 will be described. A DC-DC converter 301 of Embodiment 3 is the same as the converter of Embodiment 1, except for temperature sensors 354A and 354B being provided in place of the voltage detection units 54A and 54B, a temperature sensor 359 being provided, and a determination method in abnormality detection control.

The following will describe abnormality detection control in Embodiment 3.

Figure 4:
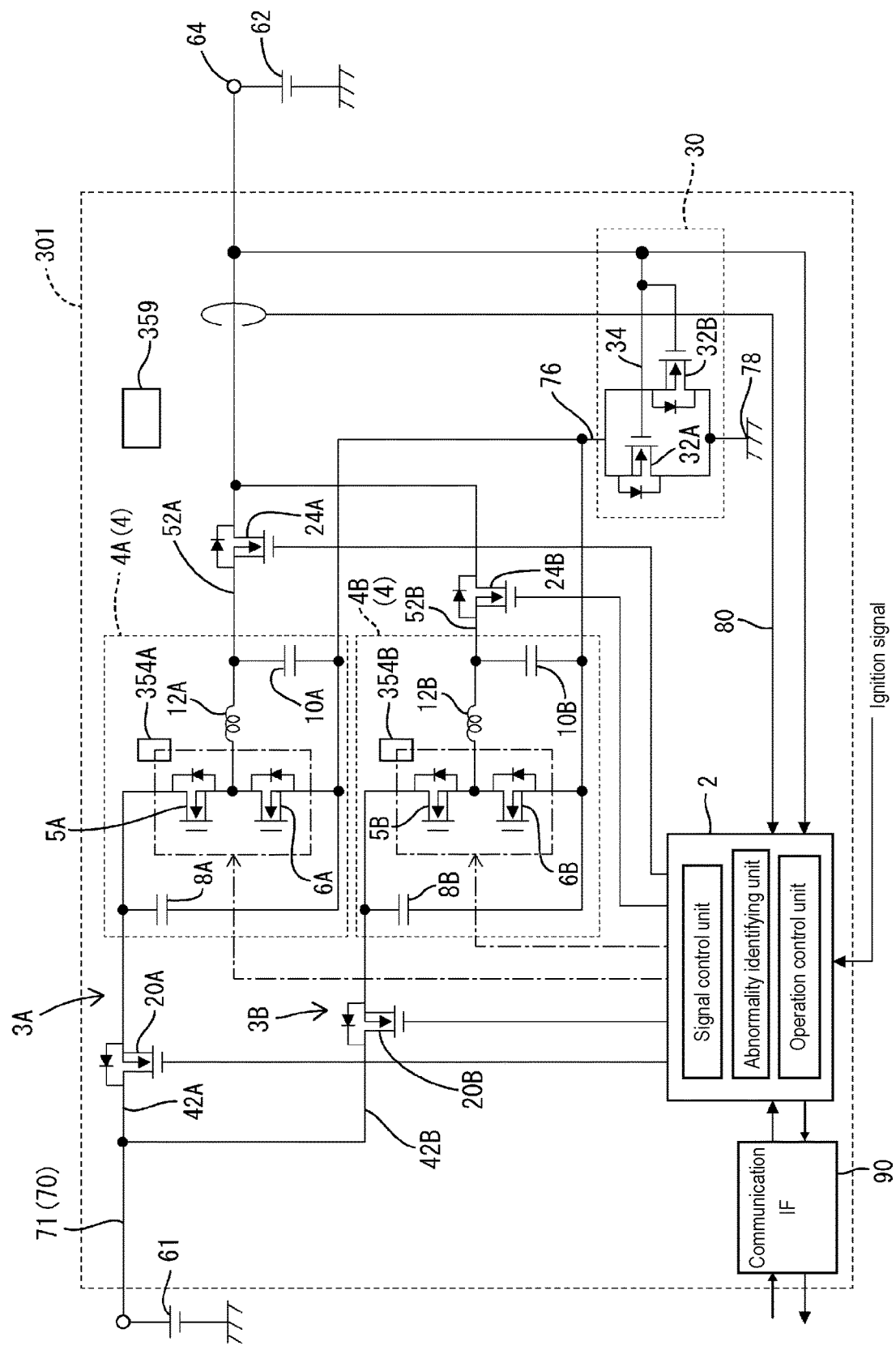
FIG. 4 is a circuit diagram schematically illustrating an example of a DC-DC converter according to Embodiment 3.

Also in the DC-DC converter 301 shown in FIG. 4, after the ignition signal is switched from OFF to ON, the control unit 2 activates the multiphase conversion unit 4. First, the voltage conversion units 4A and 4B are subjected to the above-described normal operation. Here, the duty ratio of PWM signals that are output to the voltage conversion units 4A and 4B is set to a predetermined duty ratio D1 with which a voltage V1 (for example, 13V) that is higher than an output voltage V0 (for example, 12V) of the secondary side power supply portion 62 is output to the output-side conductive path 72. Specifically, the protective switch elements 20A and 24A of the voltage conversion unit 4A are switched to the ON state, and PWM signals set to the duty ratio D1 are respectively output to the driving switch elements 5A and 6A. Setting of the duty ratio D1 is configured in the same manner as in Embodiment 1. Similarly, the protective switch elements 20B and 24B of the voltage conversion unit 4B are switched to the ON state, and PWM signals set to the duty ratio D1 are output to the respective driving switch elements 5B and 6B. The PWM signals are output to the voltage conversion units 4A and 4B with their phases shifted by a well-known control method.

Then, the control unit 2 performs a test operation on the voltage conversion unit 4A. Specifically, while the protective switch elements 20A and 24A of the voltage conversion unit 4A are kept in the ON state, PWM signals set to a duty ratio D2 for abnormality detection are output to the driving switch elements 5A and 6A. "Duty ratio D2" is set in the same manner as in Embodiment 1, and is greater, as shown in "during determination" of FIG. 2, than the duty ratio D1 "before determination". The voltage conversion unit 4A performs a voltage conversion operation (test operation) of stepping down a DC voltage applied to the individual input path 42A in accordance with the PWM signal with the changed duty ratio D2, and outputting the stepped-down DC voltage to the individual output path 52A. While the voltage conversion unit 4A performs such a test operation, a PWM signal with the duty ratio D1 is continuously output to the other voltage conversion unit 4B. Accordingly, the voltage conversion unit 4B performs a voltage conversion operation (normal operation) of stepping down a DC voltage applied to the individual input path 42B in accordance with the PWM signal with the duty ratio D1, and outputting the stepped-down DC voltage to the individual output path 52B. The control unit 2 performs such control of changing only the duty ratio of the voltage conversion unit 4A for a predetermined time period, and compares, during this predetermined time period (test period), a temperature Ta detected by the temperature sensor 354A that is arranged in the vicinity of the driving switch element 5A with a first threshold Tt1 and a second threshold Tt2. If the state Ta>Tt1 or Ta<Tt2 is given during the predetermined time period (test period) in which the duty ratio of the voltage conversion unit 4A is changed to D2, then it is determined that the voltage conversion unit 4A is abnormal. In other words, the voltage conversion unit 4A is identified as an "abnormal voltage conversion unit". In contrast, if the state Tt2<Ta<Tt1 is kept during the predetermined time period, then it is determined that the voltage conversion unit 4A is normal. Note that in the example of FIG. 1, the temperature in the vicinity of the driving switch element 5A is detected by the temperature sensor 354A, and the temperature in the vicinity of the driving switch element 5B is detected by the temperature sensor 354B, and the temperatures Ta and Tb detected by the respective detection units are input to the control unit 2.

Then, the control unit 2 performs a test operation on the voltage conversion unit 4B. Specifically, while the protective switch elements 20B and 24B of the voltage conversion unit 4B are kept in the ON state, PWM signals set to the above-described duty ratio D2 for abnormality detection are output to the respective driving switch elements 5B and 6B. The voltage conversion unit 4B performs a voltage conversion operation (test operation) of stepping down a DC voltage applied to the individual input path 42B in accordance with the PWM signal with the changed duty ratio D2, and outputting the stepped-down DC voltage to the individual output path 52B. While the voltage conversion unit 4B performs such a test operation, a PWM signal with the duty ratio D1 is output to the other voltage conversion unit 4A. Accordingly, the voltage conversion unit 4A performs a voltage conversion operation (normal operation) of stepping down a DC voltage applied to the individual input path 42A in accordance with the PWM signal with the duty ratio D1, and outputting the stepped-down DC voltage to the individual output path 52A. The control unit 2 performs such control of changing only the duty ratio of the voltage conversion unit 4B for a predetermined time period, and compares, during this predetermined time period (test period), a temperature Tb detected by the temperature sensor 354B that is arranged in the vicinity of the driving switch element 5B with the above-described first threshold Tt1 and second threshold Tt2. If the state Tb>Tt1 or Tb<Tt2 is given during the predetermined time period (test period) in which the duty ratio of the voltage conversion unit 4B is changed to D2, then it is determined that the voltage conversion unit 4B is abnormal. In other words, the voltage conversion unit 4B is identified as an "abnormal voltage conversion unit". In contrast, if the state Tt2<Tb<Tt1 is kept during the predetermined time period, then it is determined that the voltage conversion unit 4B is normal.

The temperature sensors 354A and 354B correspond to examples of detection units, and detect temperatures of the respective voltage conversion units 4A and 4B. Also, the control unit 2 that corresponds to the abnormality identifying unit identifies whether or not the target voltage conversion unit that was subjected to the test operation is abnormal, based on results of detection by the temperature sensors 354A and 354B (detection units). If an "abnormal voltage conversion unit" is identified by the abnormality identifying unit, the control unit 2 that corresponds to the operation control unit causes "any remaining voltage conversion unit" (of the plurality of voltage conversion units 4A and 4B constituting the multiphase conversion unit 4) other than the identified "abnormal voltage conversion unit" to perform voltage conversion. Accordingly, it is possible to reliably continue disabling the operation of the range of abnormality to protect it, and to continue, at the same time, the operation using the remaining voltage conversion unit.

In the configuration of Embodiment 3, the DC-DC converter 1 may also be provided with a temperature sensing unit configured to sense the temperature at a predetermined position on the DC-DC converter 1 (for example, the temperature at a predetermined position on the substrate). For example, if a DC-DC converter 1 in which a plurality of electronic components are mounted on a substrate is configured, the temperature sensor 359 serving as a temperature sensing unit is provided at a position on the substrate that is apart from the temperature sensors 354A and 354B, and the control unit 2 that corresponds to the abnormality identifying unit may also be configured to perform, if the temperature sensed by this temperature sensor 359 (temperature sensing unit) is within a predetermined range, the above-described abnormality detection control (control of determining whether or not the target voltage conversion unit is abnormal based on a result of temperature detection by the detection unit associated with the target voltage conversion unit that is subjected to a test operation).

With this, it is possible to prevent such a situation that, when the DC-DC converter 301 is under an unintended temperature condition (when the temperature at a predetermined position is out of a predetermined range), abnormality determination based on a temperature is made.

Other Embodiments

The present invention is not limited to the embodiments described with reference to the description above and the drawings, and the technical scope of the present invention encompasses, for example, the following embodiments.

(1) The specific examples of the primary side power supply portion 61 and the secondary side power supply portion 62 in the above-described embodiments are merely examples, and the types of the electrical storage means and generated voltages may vary without being limited to the above-described examples.

(2) In the example of FIG. 1, the power generator, loads, and the like that are connected to the input-side conductive path and the output-side conductive path are omitted, but various devices and electric members may be connected to the input-side conductive path and the output-side conductive path.

(3) In Embodiment 1, a configuration in which the switch elements 6A and 6B are provided on the low side is shown as an example, but a configuration in which these elements are replaced by diodes is also possible.

Figure 5:
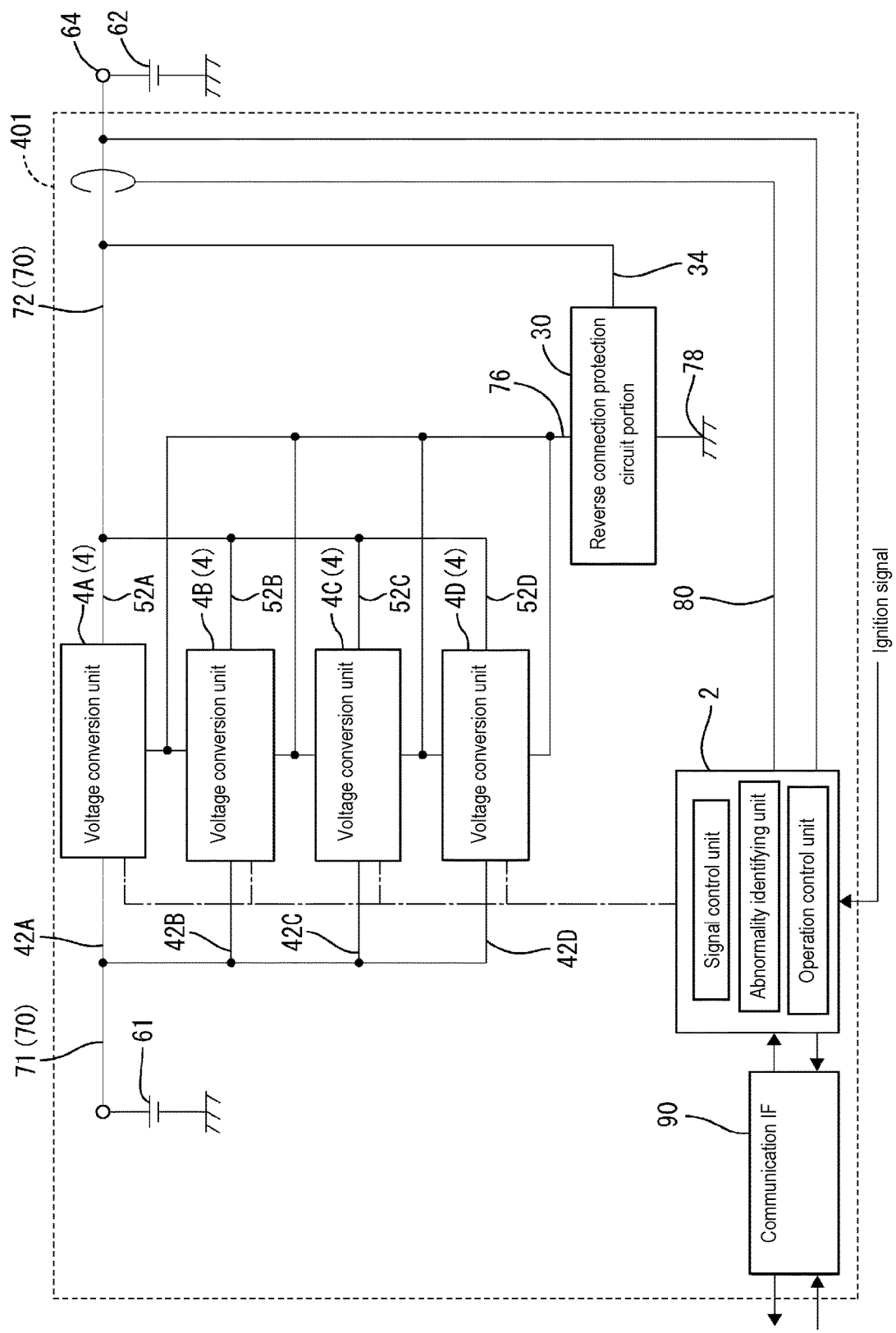
FIG. 5 is a circuit diagram schematically illustrating an example of a DC-DC converter according to another embodiment.

(4) In Embodiment 1, a two-phase structure DC-DC converter 1 in which two voltage conversion units 4A and 4B are connected in parallel to each other is shown, but a DC-DC converter 1 of a structure with three or more phases in which three or more voltage conversion units are connected in parallel to each other may also be used. For example, a four-layer structure DC-DC converter 401 as shown in FIG. 5 may be used. The DC-DC converter 401 of FIG. 5 differs from the DC-DC converter 1 of FIG. 1 in that, in addition to the voltage conversion units 4A and 4B, voltage conversion units 4C and 4D are connected in parallel to each other. Other features are the same as those of the DC-DC converter 1 of FIG. 1. The voltage conversion units 4C and 4D respectively have the same structures as those of the voltage conversion units 4A and 4B. Note that in FIG. 5, an input-side protective switch element (element that is configured and functions in the same manner as the protective switch element 20A or the like of FIG. 1) is omitted, but may also be provided on each of the individual input paths 42A, 42B, 42C, and 42D. Furthermore, an output-side switch element (element that is configured and functions in the same manner as the protective switch element 24A or the like of FIG. 1), but may also be provided on each of the individual output paths 52A, 52B, 52C, and 52D.

(5) In Embodiment 1, the control unit 2 that corresponds to the abnormality identifying unit identifies an abnormal voltage conversion unit from among the plurality of voltage conversion units constituting the multiphase conversion unit 4, but the control unit 2 that corresponds to the abnormality identifying unit may also be configured to identify a group including the abnormal conversion unit. For example, the DC-DC converter 401 of FIG. 5 may have a configuration in which, in a state in which the duty ratio for a group of the voltage conversion units 4A and 4B is set to the above-described D2, and the duty ratio for a group of the voltage conversion units 4C and 4D is set to the above-described D1, whether or not the voltages or the electric currents on the individual output paths of the voltage conversion units 4A and 4B, or temperatures in the vicinity of the driving switch elements thereof are within a normal range is determined, and if they are within the normal range, then the group of the voltage conversion units 4A and 4B is determined as a "normal group of voltage conversion units", otherwise, the group of the voltage conversion units 4A and 4B is determined as an "abnormal group of voltage conversion units". Similarly, a configuration is also possible in which, in a state in which the duty ratio for the group of the voltage conversion units 4A and 4B is set to the above-described D1, and the duty ratio for the group of the voltage conversion units 4C and 4D is set to the above-described D2, whether or not the voltages or the electric currents on individual output paths of the voltage conversion units 4C and 4D, or temperatures in the vicinity of the driving switch elements thereof are within a normal range, and if they are within the normal range, the group of the voltage conversion units 4C and 4D is determined as a "normal group of voltage conversion units", otherwise, the group of the voltage conversion units 4C and 4D is determined as an "abnormal group of voltage conversion units".

If the identification is made by the abnormality identifying unit in this way, then the control unit 2 that corresponds to the operation control unit may also cause any remaining voltage conversion units (of the voltage conversion units 4A, 4B, 4C, and 4D constituting the multiphase conversion unit 4) other than the "abnormal group of voltage conversion units" identified by the abnormality identifying unit to perform voltage conversion.

(6) In the configuration of Embodiment 1, a power storage state detection unit for detecting that the secondary side power supply portion 62 (power storage unit) is in a predetermined normal state may also be provided. Specifically, the control unit 2 or a not-shown battery sensor may also serve as the power storage state detection unit, and may also be configured to determine, for example, that the secondary side power supply portion 62 (power storage unit) is in the predetermined normal state if the voltage of the output-side conductive path 72 in a time period in which the multiphase conversion unit 4 is disabled is equal to or higher than a predetermined voltage, and otherwise determine that the secondary side power supply portion 62 (power storage unit) is in an abnormal state. Also, a configuration is also possible in which the above-described abnormality detection control is executed only if the secondary side power supply portion 62 (power storage unit) is determined as being in the "predetermined normal state".

(7) In the configurations of all embodiments, the above-described abnormality detection control may also be executed only if the temperature of the DC-DC converter is within a predetermined range, or the above-described abnormality detection control may also be executed only if the output electric current of the DC-DC converter is within a predetermined range. Alternatively, the above-described abnormality detection control may also be executed only if both the temperature and the output electric current of the DC-DC converter are within appropriate ranges.

The invention claimed is:

1. A multiphase converter comprising:
a plurality of voltage conversion units; and
a control unit configured to output PWM signals to the voltage conversion units to control the voltage conversion units individually,
wherein the control unit includes:
a signal control unit configured to output PWM signals to the respective voltage conversion units, and change a duty ratio of the PWM signal that is output to a target voltage conversion unit or a target group of voltage conversion units that is to be subjected to a test operation, during a predetermined test period, the predetermined test period being a discrete period occurring within an operation of the multiphase converter;
an abnormality identifying unit configured to identify, from among the plurality of voltage conversion units, an abnormal voltage conversion unit or a group including the abnormal voltage conversion unit subject to a predetermined abnormal state with respect to at least one of an electric current, a voltage, and a temperature during the test period; and
an operation control unit configured to cause, if the abnormality identifying unit has identified an abnormal voltage conversion unit or group, the abnormal voltage conversion unit or group to cease and any remaining voltage conversion unit of the plurality of voltage conversion units other than the identified abnormal voltage conversion unit or group including the abnormal voltage conversion unit to continue to perform voltage conversion.

2. The multiphase converter according to claim 1, wherein, when performing the test operation, the signal control unit continues outputting a PWM signal with a duty ratio that is different from the duty ratio changed in the test operation to a voltage conversion unit not under test, so that the voltage conversion unit not under test continues the voltage conversion.

3. The multiphase converter according to claim 1, wherein the plurality of voltage conversion units are provided with a plurality of detection units that are each associated with a voltage conversion unit or a group of voltage conversion units, and are configured to detect at least one of an electric current, a voltage, and a temperature of the associated voltage conversion unit or group of voltage conversion units, and
the abnormality identifying unit identifies whether or not the target voltage conversion unit or the target group of voltage conversion units that was subjected to the test operation is abnormal, based on a result of detection by the associated detection unit.

4. The multiphase converter according to claim 3, further comprising:
a temperature sensing unit configured to sense a temperature at a predetermined position on the multiphase converter,
wherein, if the temperature sensed by the temperature sensing unit is within a predetermined range, the abnormality identifying unit identifies whether or not the target voltage conversion unit or the target group of voltage conversion units that was subjected to the test operation by the signal control unit is abnormal based on a result of temperature detection by the detection unit that is associated with the target voltage conversion unit or the target group of voltage conversion units.

5. The multiphase converter according to claim 2, wherein the plurality of voltage conversion units are provided with a plurality of detection units that are each associated with a voltage conversion unit or a group of voltage conversion units, and are configured to detect at least one of an electric current, a voltage, and a temperature of the associated voltage conversion unit or group of voltage conversion units, and
the abnormality identifying unit identifies whether or not the target voltage conversion unit or the target group of voltage conversion units that was subjected to the test operation is abnormal, based on a result of detection by the associated detection unit.

* * * * *